United States Patent [19]

Pipkin et al.

[11] 4,299,186
[45] Nov. 10, 1981

[54] METHOD AND APPARATUS FOR APPLYING A VISCOUS FLUID TO A SUBSTRATE

[75] Inventors: David J. Pipkin, Longmont; Donald W. Schaefer, Lakewood, both of Colo.

[73] Assignee: International Business Machines Corporation, Armonk, N.Y.

[21] Appl. No.: 163,366

[22] Filed: Jun. 26, 1980

Related U.S. Application Data

[60] Continuation of Ser. No. 961,916, Nov. 17, 1978, abandoned, which is a division of Ser. No. 759,972, Jan. 17, 1977, Pat. No. 4,142,010.

[51] Int. Cl.$^3$ ............................ B05C 1/04; B05C 3/18
[52] U.S. Cl. ................................... 118/407; 118/410; 118/419; 425/131.1; 425/461; 427/356
[58] Field of Search .................. 425/461, 465, 131.1; 427/128, 355, 356, 357, 358, 434.1; 118/407, 410, 419

[56] References Cited

U.S. PATENT DOCUMENTS

| | | | |
|---|---|---|---|
| 2,230,876 | 2/1941 | Wysong | 91/67.9 |
| 2,309,981 | 2/1943 | Randall | 91/43 |
| 2,464,771 | 3/1949 | Van Guelpen | 118/410 |
| 2,875,728 | 3/1959 | Kasak | 118/410 |
| 3,274,646 | 9/1966 | Krystof | 118/13 |
| 3,556,832 | 1/1971 | Park | 117/7 |
| 3,632,374 | 1/1972 | Greiller | 117/34 |
| 3,679,476 | 7/1972 | Oosterhout et al. | 117/236 |
| 3,869,304 | 3/1975 | Bogulslawski | 117/65.2 |
| 3,957,406 | 5/1976 | Battersby | 425/376 |
| 3,994,654 | 11/1976 | Chyu | 425/376 |
| 4,051,807 | 10/1977 | Graf | 118/410 |

*Primary Examiner*—Shrive P. Beck
*Attorney, Agent, or Firm*—James M. Thomson

[57] ABSTRACT

A method and apparatus for applying a viscous fluid to a moving substrate is disclosed. The invention includes providing a die assembly from a pair of plates which are separated by shim means to define a fluid passage. The fluid passage communicates with a fluid reservoir having an opening bounded by smooth surfaces for contacting the substrate. The supply of ink is metered to the passage. The substrate is moved in contact with the smooth surfaces and the fluid is applied thereto by the reservoir. The trailing or downstream edge of the smooth surface is formed with an acute angle. Other features are also disclosed.

3 Claims, 3 Drawing Figures

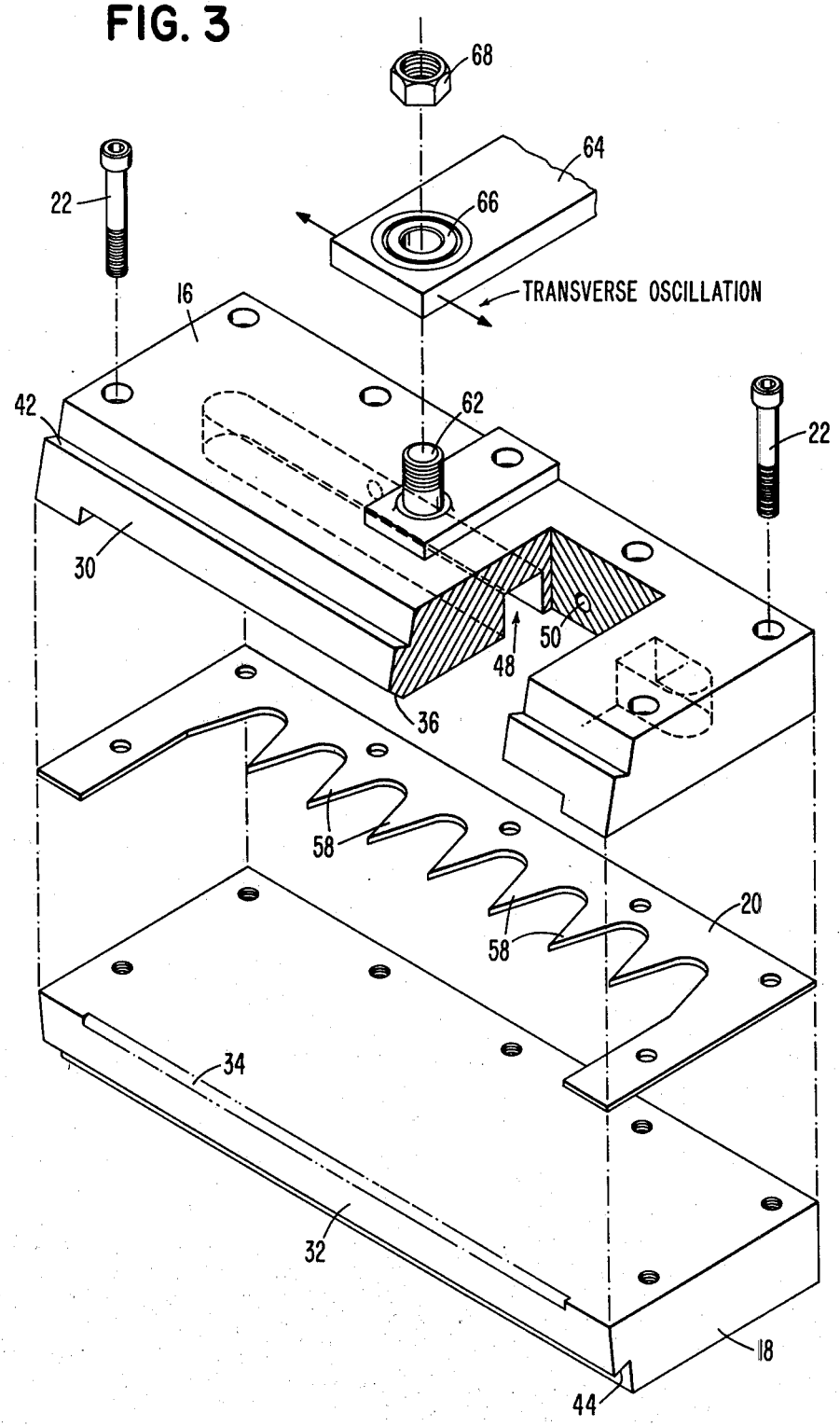

METHOD AND APPARATUS FOR APPLYING A VISCOUS FLUID TO A SUBSTRATE

This is a continuation of application Ser. No. 961,916, filed Nov. 17, 1978, and now abandoned, which is a division of Ser. No. 759,972, filed Jan. 17, 1977, now U.S. Pat. No. 4,142,010.

BACKGROUND OF THE INVENTION

This invention relates to die assemblies for extruding liquids and more particularly to a die assembly which is suitable for extruding high viscosity liquids such as magnetic inks onto a moving substance.

The conventional prior art practice for applying magnetic inks to a flexible substrate for the manufacture of magnetic recording tapes and the like, has been by the gravure coating technique. In the gravure coating technique a pair of rolls are rotated relative to each other and the substrate on which the coating is to be applied is passed therebetween. One of the rolls is rotated in contact with a supply of the coating material and the rotating roll applies this coating material and the rotating roll applies this coating material to one side of the substrate as it is passing thereby.

The gravure technique has several disadvantages. First, coating thickness cannot be changed significantly without changing gravure rolls. Further, there has to be a recirculation of the coating material due to the excessive amount of coating applied over and above what is necessary during the coating process. Moreover, the machinery requires constant operator adjustment, and even then precise thickness control of the coating is not always achieved.

Thus, while the gravure process is an acceptable process for coating high viscosity magnetic inks onto flexible substrates, nevertheless there are certain limitations which adversely affect this gravure technique.

The present invention overcomes many of these defects in that it provides a device which will allow a much closer control of thickness without any equipment change and eliminates the need for any recirculation of ink, reduces the amount of adjustment needed in coating and allows for substantially higher coating speeds in the coating process.

SUMMARY OF THE INVENTION

According to the present invention, a die assembly for extruding high viscosity liquids onto a substrate moving relative thereto is provided. The die assembly includes an upstream plate and downstream plate separated by shim means disposed therebetween, which plates together with the shim means and defines a liquid passage terminating with a discharge opening. Each of the plates terminates in a smooth material contacting surface, which surfaces bound the discharge opening. A reservoir is formed in at least the upstream plate adjacent to and communicating with the liquid passage at the discharge opening. The downstream plate forms an acute angle with the material contacting surface thereof. A source of supply for a viscous fluid communicates with the liquid passage.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 3 is an exploded perspective view of the extrusion head assembly of this invention.

DESCRIPTION OF THE PREFERRED EMBODIMENT

Figure 1:
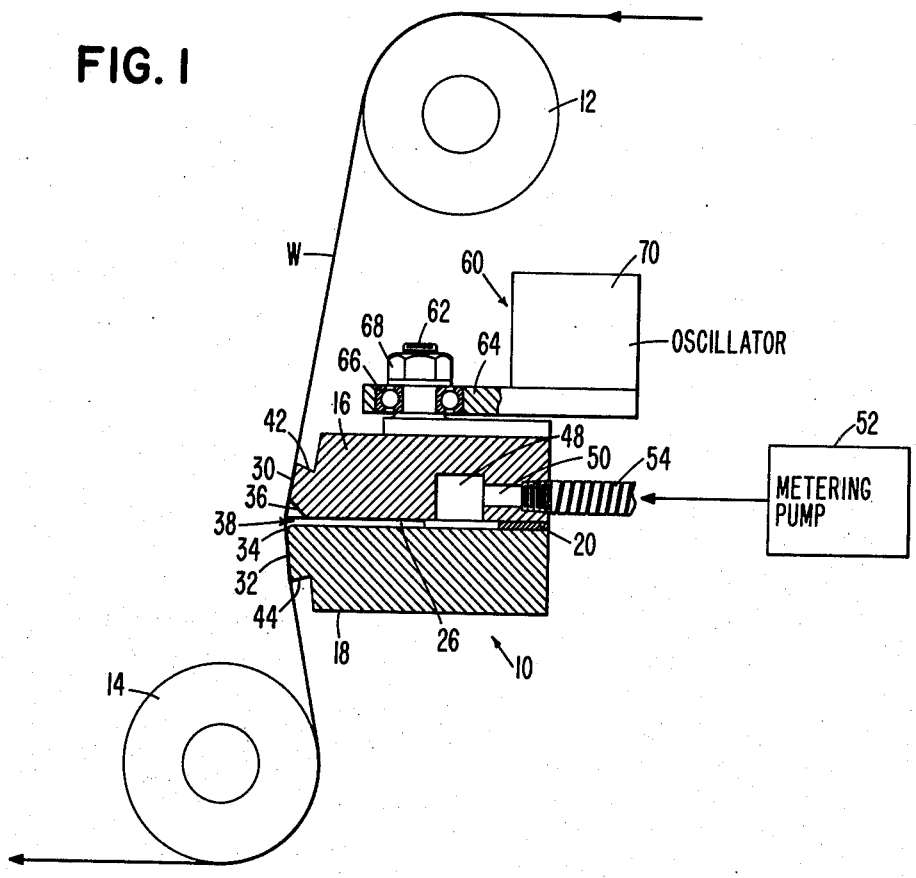
FIG. 1 is an elevational view, somewhat diagrammatic of a coating line showing the extrusion head of this invention in longitudinal section.

Referring now to the drawing, an improved extrusion head assembly of this invention is shown and designated generally by the reference character 10. The head assembly is shown in conjunction with the somewhat diagrammatically represented extrusion line which includes an entrance guide roll 12 and an exit guide roll 14 which guide a web of material W on which an extrusion coating of a viscous material is to be applied. In the preferred embodiment the material to be coated onto the web is what is known as magnetic ink which includes a polyurethane isocyanate binder having magnetic particles adamixed therewith. The web of material may be any one of a variety of flexible materials such as a polyester plastic sold by E. I. duPont under the name Mylar. However, the invention is not limited to this and can be used to coat other viscious substances onto various substrates.

The head assembly includes plates 16 and 18 and shim 20 which are secured together in any suitable manner such as by bolts 22 and passing through aligned apertures (unnumbered) provided in the plates and shim to form a head, the apertures in plate 18 being tapped to threadably receive the bolts. The plates 16 and 18 and shim 20 define a fluid passage 26 therebetween.

It is also possible to achieve the same "shim" results by actually machining recesses in the interior of one or both of the plates leaving ridges around the peripheries of the interior which will provide the required passage 28. In such a case the shimming function is performed by the ridges formed on the plate or plates themselves.

The plates 16 and 18 are provided with smooth material contacting surfaces 30 and 32, respectively at the ends thereof. The plate 18 also has a rounded edge 34 and the plate 16 is provided with a slanting "V" surface 36. The slanting "V" surface 36 and rounded edge 34 together with the smooth end surfaces 30 and 32 on the plates together define an open ended fluid reservoir 38 at the end of the passage 26.

The upstream plate 16 is provided with an entrance surface 42 which meets with the material contacting surface 30 at an acute angle; similarly the downstream plate 18 is provided with an exit surface 44 which meets with the material contacting surface 32 also to form an acute angle.

A fluid supply plenum 48 is formed in the upstream plate 16 and communicates with the passage 26 to supply fluid thereto. The plenum 48 communicates through an opening 50 and through a flexible conduit 54 with a metering pump 52. The metering pump 52 supplies a constant volume of fluid to the plenum 48.

Figure 2:
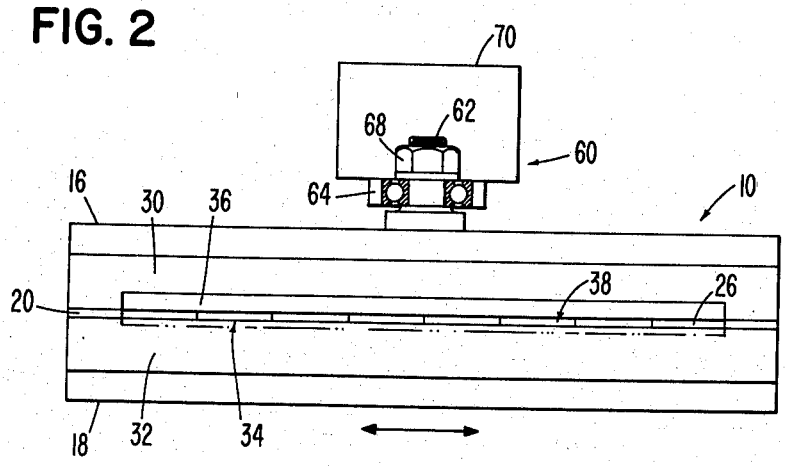
FIG. 2 is a top plan view of the extrusion head assembly of this invention.

The head assembly is mounted for both pivotal movement and oscillation movement by means of mounting mechanism generally designated by the reference character 60. The mounting mechanism includes a threaded stud 62 extending from the plate 16 which is connected to an oscillating arm 64 by ball bearing 66. A nut 68 secures the arm 64 to the stud 62, while permitting rocking or pivotal movement of the head assembly 10. An oscillating motor 70 is connected to the oscillating arm 64 and is arranged to provide an oscillating movement of the arm to move the head back and forth across the tape as indicated by the arrows in FIGS. 2 and 3.

As can be seen in FIG. 3 the shim 20 is preferably provided with a plurality of fingers 58 which in effect provide a serrated terminus for the passage 26.

In operation, the web of flexible plastic W is constantly moved across the smooth material contacting surfaces 30 and 32 by any appropriate drive mechanism (not shown). The coating material is provided from the metering pump 52 to the plenum 48 through the passage 26 and to the reservoir 68 and applied to the material therefrom. The thickness of the coating can be closely controlled by varying the delivery of the metering pump 52.

The two essential features of the present invention are the provision of the reservoir 38 and the acute exit angle formed by the surfaces 32 and 44. It has been found that when there is provided this enlarged reservoir adjacent the moving web and an acute exit angle coupled with the smooth material contacting surfaces an extremely smooth coating of controlled thickness can be applied to a web of material as it moves therepast. It is essential that the reservoir 38 be formed at least partially on the upstream side (on the side of the web before it is coated) of the passage 36. It is possible however, to have at least a portion of the reservoir 38 formed on the downstream side which would entail machining both of the plates 16 and 18 to the proper configuration. In any event there must be a reservoir supply of the fluid on the upstream side of the passage 26.

It has been found that in order to obtain a good transfer of the fluid and obtain a smooth final surface of uniform thickness, that it is essential to have smooth flat material contacting surfaces 30 and 32 together with an acute angle trailing edge formed by the surfaces 32 and 44 and the reservoir 38. These features together co-act to provide a uniformly good coating application with respect to uniform thickness and smooth final surface. It has also been found that in order to get uniformity of distribution across the web the gap thickness (i.e., the distance between the plates 16 and 18) must be maintained to a very close tolerance. The distance between the plates which forms the passage 26 may be different to provide different size passages for different applications. However, it has been found that the thickness of between approximately 0.010 and 0.012 of an inch is generally satisfactory for a coating of magnetic inks, according to this invention. Nevertheless, whatever size is selected the tolerance should be maintained to approximately 0.0002 of an inch throughout the entire width thereof, i.e., the distance across the web, to assure uniformity of flow.

It has also been found that the relationship of the thickness of the reservoir 38 to the thickness of the passage 26 is important. The reservoir should be at least about two times the thickness of the passage but no more than about ten times the thickness of the passage.

The rounded edge 34, is a desirable feature which is provided in order to allow for the passage of any small foreign particles in the ink. If this edge were sharp, the particles would tend to hang up on this edge and form a barrier. However, by slightly rounding this edge as a 34 it will allow small particles to pass on without hanging up and prevent the build-up of foreign particles at this point. The acute angle formed by the surfaces 30 and 42 is a desirable feature which contributes to the smooth deposition of the coating and the smooth flow of the web. However, this is not critical and merely a desired feature. Also this edge may be beveled, instead of rounded with a radius when machining practice so dictates and the term "rounded" is intended to include such beveling.

The mounting on the ball bearing 66 allows the head to freely pivot thereby being self aligning to the web of material. The oscillation of the head is back and forth across the web transversely on its path of travel. This in conjunction with a post coating smoothing device (not shown) prevents any continuous line defects from forming, which could be caused by particles building up at edge 34 or any minor defects in the structure.

In summarizing, it has been found that the combination of the material contacting surfaces together with a reservoir adjacent these contacting surfaces and an acute angle trailing edge on the downstream side, together form a die assembly that provides a uniformly good coating of a viscious fluid.

While the invention has been particularly shown and described with reference to preferred embodiments thereof, it will be understood by those skilled in the art that various changes in form and details may be made therein without departing from the spirit and scope of the invention.

What is claimed is:

1. A head assembly for applying a smooth coating of a high viscousity liquid to a substrate moved relative thereto, comprising,
    an upstream plate and a downstream plate with means spacing said plates apart defining a passage of uniform dimension therebetween, extending across a major portion of the plates,
    means adapted to communicate between a source of fluid supply and a back portion of said passage,
    a generally V-shaped reservoir communicating with a front of said passage, the reservoir including enlarged portions upstream and downstream of the passage, definedby a slanted face formed in the trailing edge of the upstream plate and a rounded edge formed in the leading edge of the downstream plate,
    said plates otherwise terminating in smooth, wide substrate contacting surfaces bounding the reservoir with the downstream edge of the downstream plate being formed at an acute angle with respect to the smooth surface thereof,
    means for mounting said head assembly for pivotable, self-aligning movement with respect to said substrate, and
    means for moving said head assembly back and forth in an oscillating motion with respect to said substrate.

2. The head assembly of claim 1 where the greatest thickness of the reservoir is a constant width from two to ten times the thickness of the passage.

3. The head assembly of claim 2 wherein the leading edge of the upstream plate meets the smooth surface thereof at an acute angle.

* * * * *

UNITED STATES PATENT AND TRADEMARK OFFICE
CERTIFICATE OF CORRECTION

PATENT NO. : 4,299,186
DATED : November 10, 1981
INVENTOR(S) : David J. Pipkin and Donald W. Schaefer It is certified that error appears in the above—identified patent and that said Letters Patent is hereby corrected as shown below:

In the Abstract, line 3, after "assembly" insert --formed--.
Column 1, line 14, "substance" should read --substrate--;
Column 1, line 60, after "downstream" insert --edge of the downstream--.

Column 3, line 15, "68" should read --38--;
Column 3, line 66, after "as", change "a" to --at--.
Claim 1, line 45, "definedby" should read --defined by--.

Signed and Sealed this

Twenty-third Day of March 1982

[SEAL]

Attest:

GERALD J. MOSSINGHOFF

Attesting Officer    Commissioner of Patents and Trademarks